April 8, 1930.  G. R. LUM  1,753,346
SOUND RANGING SYSTEM
Filed June 19, 1923  5 Sheets-Sheet 1

Fig. 1

Inventor:
George R. Lum,
by Joel Ch. Palmer Att'y.

Patented Apr. 8, 1930

1,753,346

UNITED STATES PATENT OFFICE

GEORGE R. LUM, OF NEW YORK, N. Y., ASSIGNOR TO WESTERN ELECTRIC COMPANY, INCORPORATED, OF NEW YORK, N. Y., A CORPORATION OF NEW YORK

SOUND-RANGING SYSTEM

Application filed June 19, 1923. Serial No. 646,304.

This invention relates to sound ranging systems of the type adapted for determining the direction of a source of wave energy.

It is an object of the invention to provide new and improved electrical compensating devices and switches, whereby very close degrees of adjustment in the circuit may be easily obtained, thereby making possible the finding of the direction of a source of sound more accurately than has heretofore been possible.

The sound ranging systems to which the present invention is particularly adapted are of the type in which the direction of a source of sound such as a ship, is determined by measurement of the phase difference of the sound arriving at two known points. The equipment consists essentially of sea phones which may be mounted in a structure known as a caisson located at a point on the sea floor, an observer's desk including an electric compensator device, switches and other apparatus required at the shore station, and a submarine cable to provide electrical connection between the observer's desk and the sea station. The electrical oscillations from each sea phone are transmitted independently over the cable to the receiving equipment at the observer's desk.

If the sound source is nearer one of a pair of sea phones, say the right, than the other, then the electrical oscillations set up in the circuit connected to this sea phone will precede by a certain time interval the corresponding oscillations in the circuit connected to the left sea phone. This time interval is determined by the difference in length of the water paths from the sound source to the two sea phones, or in other words, by the direction of the source of sound with respect to the line adjoining the pair of sea phones. These electrical oscillations are converted into sound waves at the shore station by two receivers, one independently associated with each sea phone circuit. An observer with a receiver at each ear hears the sound as coming from his right if his right ear is associated with the right sea phone.

If now a suitable electrical network is inserted in the right circuit to retard the electrical oscillations by the same time interval as that separating them at the sea phones the sound waves produced by the receivers will be in phase. Under these conditions, the source of the sound seems to the observer to be directly ahead and a binaural balance is said to exist. The amount of retardation or lag which it is thus necessary to insert in the right circuit is a measure of the direction of the sound source. In some instances, a single observation leaves an ambiguity as to the direction since there are two directions from which the sound will affect the detectors the same. However, this ambiguity can always be removed by a second observation using a pair of detectors establishing a base line at an angle to that first used.

The different means for effecting this compensation or retardation in systems of the type herein disclosed are the electrical compensator devices and the switches. By operating the compensator switch which forms a part of the subject matter of the present invention, the observer varies the amount of compensating network inserted, until the binaural balance is obtained; and the direction or bearing required is then deduced from the scale reading indicated by the compensator dial.

The construction of the compensator dial, the two unit construction of the compensator switch permitting its ready assembly after cleaning and adjustment, and the particular arrangement of parts which is thought preferable, will appear from the following description taken in connection with the accompanying drawings, in which.

Figure 1:
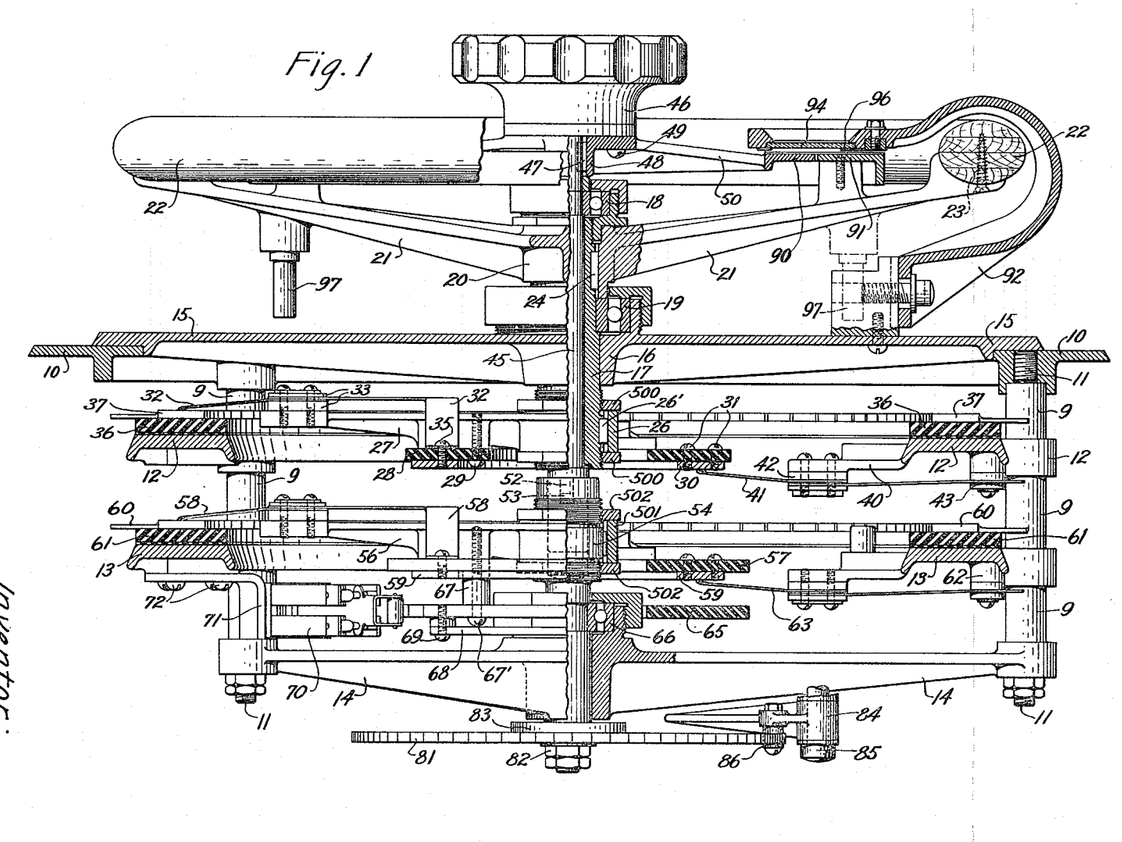
Fig. 1 is an elevation, partially in section, showing the invention in its preferred form.

Referring to the drawings, a main mounting plate 10 is clamped by means of bolts 11 and collars 9 to a pair of contact segment supporting rings 12 and 13, and to a lower spider 14. The inner edge of the main mounting plate 10 is machined to receive an accurately fitted cover plate 15 having a central hole at 16. A hollow shaft 17 passes through the hole 16 and is journaled in a pair of ball-bearings 18 and 19 which are spaced apart by the hub 20 of the hand wheel. The hand wheel comprises a plurality of spiders 21 which project from the hub 20 and to the upper grooved ends of which the rim of the hand wheel 22 is attached in any suitable manner, as by means of screws 23. The hub 20 of the hand wheel is keyed to the hollow shaft 17 by means of key 24, thus causing the shaft 17 to rotate with the hand wheel.

The lower extremity of the hollow shaft 17 passes through a hub 26 which is rigidly associated with contact arm 27, the hub being splined to the shaft by a spline 26'. The hub is held in place by lock nuts 500 which may be shifted to adjust the pressure of brush 32. An insulating ring 28 is mounted on the under side of the arm 27 by means of screws 29, while a ring 30 of conducting material is mounted on the under side of the ring 28 by means of screws 31. A spring contact brush 32 is clamped between insulating strips 33 on the arm 27, the inner end of the brush 32 being clamped to the face of the insulating ring 28 and electrically connected to the conducting ring 30 by means of a screw 35.

It will readily be seen that since the rotation of the hand wheel 22 causes the rotation of the hollow shaft 17, it will also control the rotation of the contact brush 32 over the contact supporting ring 12. The supporting ring 12 is provided on its upper face with an annular strip of insulating material 36 upon which are mounted contact segments 37 which are adapted to be selectively engaged by the contact brush 32. The contact segments 37 are preferably provided with reduced perforated outer ends (Figs. 2 and 3) for connection to the artificial line section as hereinafter more fully described.

A lug 40, formed on the inner edge of the ring 12, supports a spring contact finger 41, suitably insulated at 42 which makes wiping engagement with the conducting ring 30. A binding post 43 serves as a support for the outer end of the contact spring 41 and also as a connecting post for establishing a connection to the external circuit. By means of this construction, it will be evident that an electrical circuit may be traced from the binding post 43, through spring finger 41, conducting ring 30 and brush 32 to any one of the contact segments 37 upon which the brush 32 is resting.

The hollow shaft 17 serves as a bearing for the central shaft 45 which extends therethrough and which is keyed to a knob 46 by means of a key 47. The knob 46 has a hub 48 fixed to its under side by means of screws 49, a plurality of spiders 50 extending from the hub to support the scale as hereinafter more fully described. The lower extremity of the central shaft 45 fits into the capped end of shaft 54 and is provided with a squared key 52 adapted to fit within a slot 53 in the wall of the capped portion of the shaft 54 to cause shaft 54 to rotate with shaft 45. This construction allows the cover plate 15 and the mechanisms associated with the hollow shaft 17 to be removed as a unit, and makes both the lower parts of the switch accessible for cleaning of the contact segments or adjusting the brushes.

The contact arm 56 is rigidly associated with a hub 501 which is splined to lower shaft 54 and is held in position by lock nuts 502. Arm 56 carries a cam 57 of insulating material similar in construction and mounting to the insulating ring 28 described above. The arm 56 carries a spring contact brush 58 electrically connected at one end to a ring of conducting material 59 on the under side of the cam 57. At its other end, brush 58 is adapted to make wiping engagement with the ring of contact segments 60 supported on the ring 13 by means of an annular strip of insulating material 61. Electrical connection is maintained between the contact ring 59 and the binding post 62 by means of a brush 63.

Figure 3:
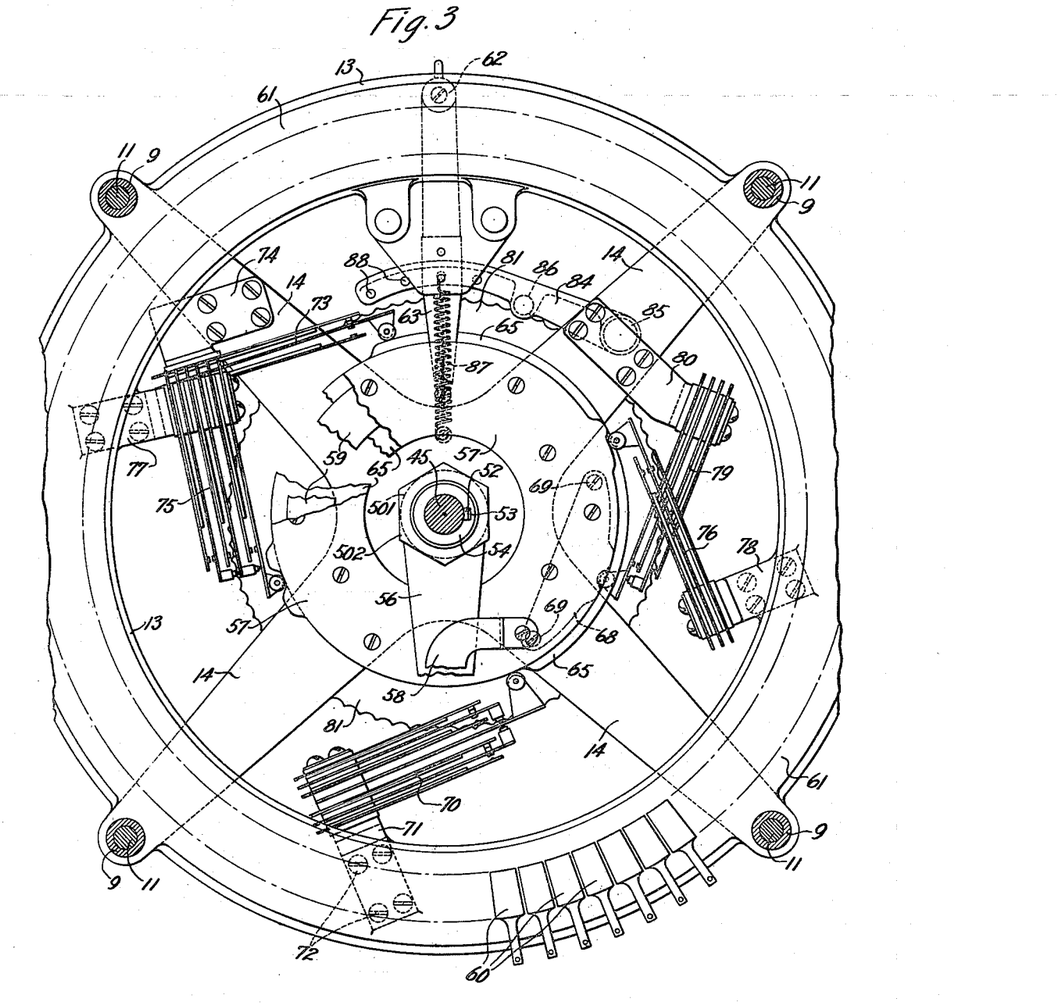
Fig. 3 is a view of the lower part thereof, showing the cams and spring assemblies.

From the above description, it will be seen that the hand wheel 22 controls the fine adjustment brush 32 which is adapted to sweep over the contact segments 37, and that the knob 46 controls the coarse adjustment brush 58 which sweeps over the segments 60. The knob 46 also controls the operation of three cams for operating in a predetermined sequence, certain piles of switch springs required in the operation of the circuits. One cam, 57, is fastened to rotate with the lower shaft 54, while the cam 65 loosely encircles ball bearing 66 which supports the lower end of shaft 54, and is firmly fastened to the cam 57 by suitable means such as spacers 67 and screws 67'. The third cam 68, best shown in Fig. 3, is fixed to the under side of cam 65 by means of screws 69.

A plurality of spring pile-ups are fastened to the under side of the plate 13 each in position to be operated by one of the cams. The spring assembly 70 is mounted on a bracket 71 which is secured to the plate 13 by means of screws 72, while the pile-up 73 is mounted on the plate 13 by means of bracket 74, these spring pile-ups being operated by the cam 65. Similarly the pile-ups 75 and 76, operated by the cam 57 are supported by the brackets 77 and 78, respectively, and the lone pile-up 79 associated with the cam 68 is mounted on a bracket 80.

A notched locking wheel 81 is keyed to the lower end of the shaft 54 and is held thereon by means of nuts 82, being spaced from the hub of the spider 14 by means of a washer 83. A finger lever 84 is pivoted on a pin 85 depending from the bottom of spider 14 and is provided with a detent roller 86 which is held in engagement with the notches of the locking wheel by means of a coil spring 87. The spring 87 is fixed at one end to the spider 14 and at the other end may be selectively inserted into any one of a plurality of holes 88 in the lever 84 to vary the effective tension of the spring. The locking wheel 81 is so positioned on the shaft 54 that the detent roller 86 will lie in a groove in the wheel when the contact brush 58, whose rotation is also controlled by the shaft 54, lies directly on a contact segment 60. This construction not only serves to correctly position the contact brush on any segment to which it is rotated, but also serves to hold the cams 57, 65 and 68 in any position to which they may be rotated against any possible tendency of the spring pile-up to rotate the cams, and also holds the operating shaft against accidental jars.

Both the hand wheel 22 and the knob 46, which operate the brushes on the separate segment rings, are provided with scales to indicate the position of the brushes with relation to the segments. The coarse adjustment scale 90 is mounted on the spider 50 and hence is controlled by the knob 46 while the fine adjustment scale 91 is mounted on the spiders 21 and hence is controlled by the hand wheel 22. An index arm 92 is mounted on the cover plate 15 and supports a glass window 94 with a hair line 95 for use with the inner scale 90, and an adjustable pointer 96 for the outer scale 91. The adjustable index 96 is for the purpose of correcting the observer's binaural center.

Figure 2:
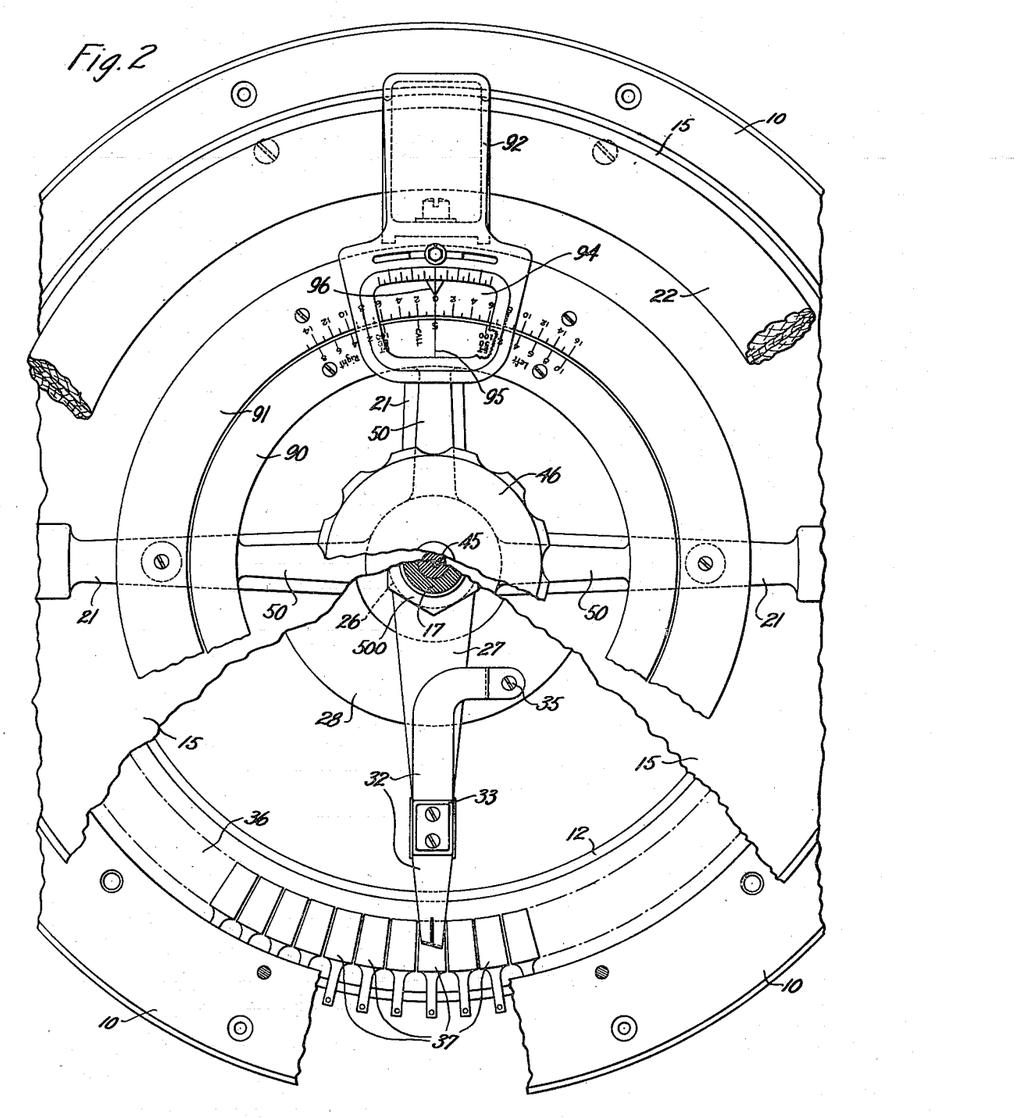
Fig. 2 is a fragmentary plan view of the upper part of the switch, showing the scales.

Readings are taken by rotating the scales under the index arm past the hair line and adjustable pointer respectively. The compensator scales are preferably calibrated in divisions proportional to equivalent water paths. The outer scale 91 for the fine adjustment and operated by the hand wheel 22 may be conveniently provided with scale divisions equivalent to .75 water inch. Counter-clockwise motion of the hand wheel 22 adds compensation to one circuit and subtracts it from another as hereinafter described. The divisions of the inner or coarse adjustment scale 90 may conveniently be equivalent to 15 water inches, in which case the ratio of the coarse adjustment scale unit to the fine adjustment scale unit is 20 to 1. The invention is not, however, limited to any particular scale calibration.

A stud 97 depends from the hand wheel 22 and is adapted to engage the base of the index arm 92 as shown in the alternative position in dot-dash Fig. 1 to prevent the rotation of the hand wheel 22 and consequently the scale 91 more than approximately 180° from normal in either clockwise or counter-clockwise direction.

Figure 4:
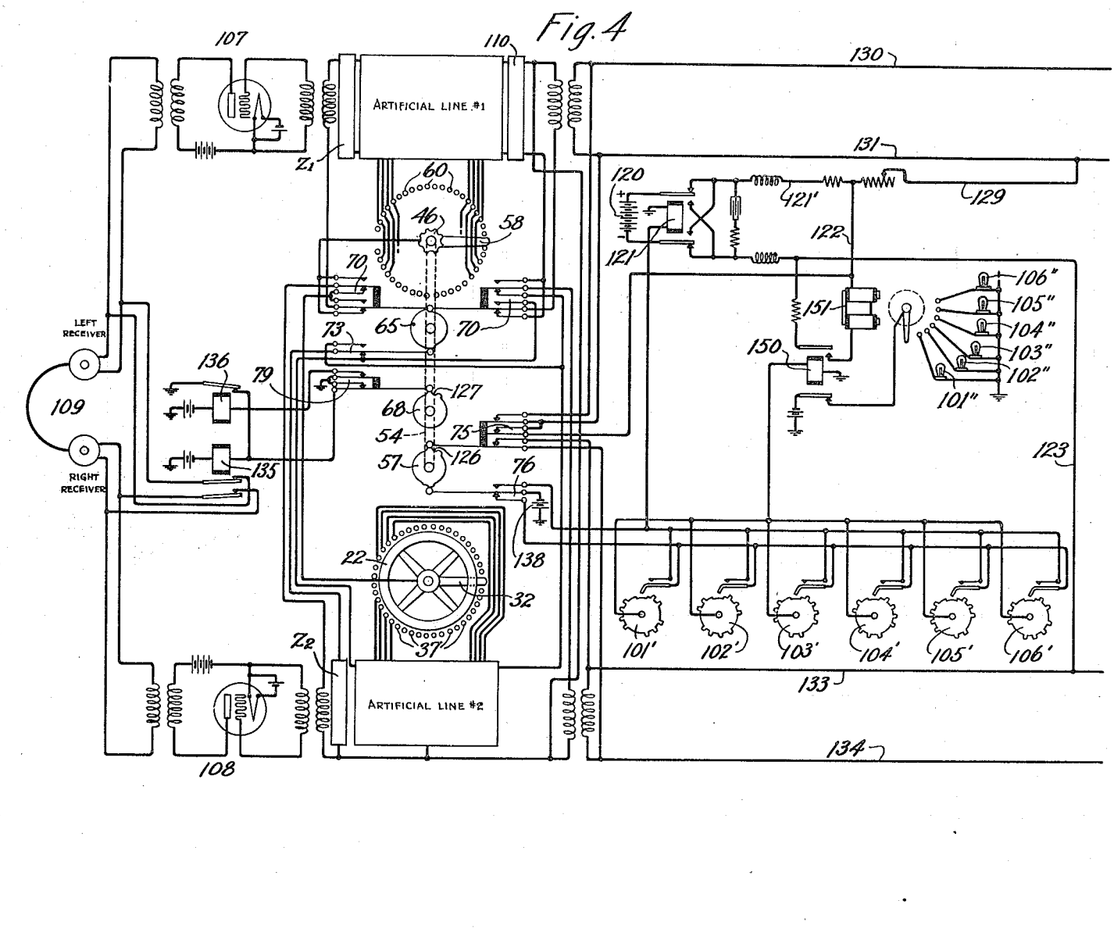
Figs. 4 and 5, when matched end to end show diagrammatically a subaqueous sound ranging system illustrating the invention.
Figure 5:
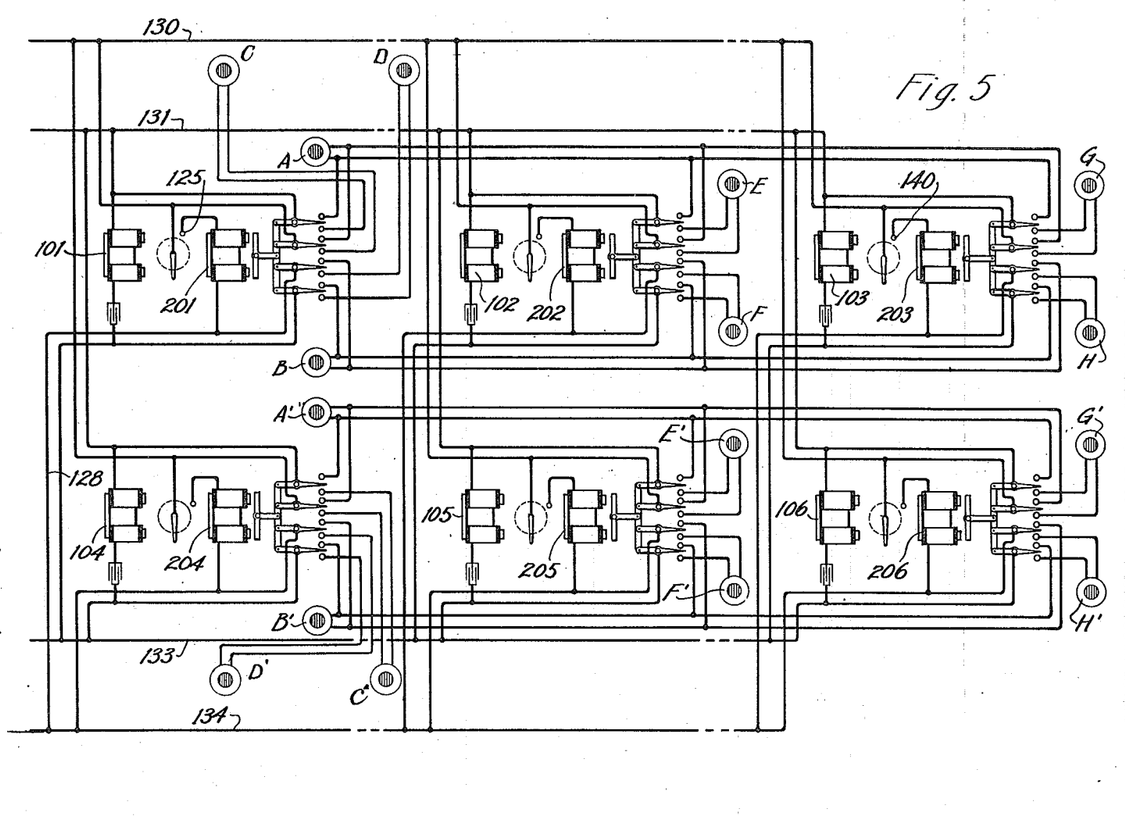

Figs. 4 and 5 when matched end to end show schematically a sound ranging system in which Fig. 4 shows the apparatus at the observer's station, which may be located at any suitable point on shore, and Fig. 5 shows the apparatus at the detector station which may be located in a "caisson" suitably positioned on the sea floor. The pairs of seaphones A'—B', C'—D', E'—F', and G'—H', with their associated switching devices 104, 105, 106, 204, 205 and 206 comprise a spare group of equipment which is a duplicate of the pairs of seaphones A—B, C—D, E—F, and G—H and their associated switching devices. Only one such group will therefore be considered.

The accuracy with which the bearing of a source of sound may be obtained increases with the length of base line established by the seaphones. However, it may be tedious and time consuming to obtain a bearing directly upon a long base line, and hence the system is arranged with short base lines for obtaining approximate bearings and long base lines for subsequently obtaining the bearings accurately. For example, seaphones A—B may establish a five foot base line and phones C—D another five foot base line perpendicular to the line of A and B. Pairs of seaphones E—F and G—H may establish base lines of fifty and one hundred feet respectively, each parallel to the line of A and B. With this arrangement the procedure is to make an observation using pair A—B which gives an approximate result limiting the sound to two possible directions; then observe using pair C—D to limit the sound to one of the two possible directions. The approximate direction then being known, a final observation is made on either the fifty foot base line (seaphones E and F) or the one hundred foot base line (seaphones G and H).

At the observing station (Fig. 4) are located impulse sending keys 101', 102', 103', 104', 105' and 106' corresponding respectively to selectors 101, 102, 103, 104, 105 and 106, which selectors are responsive to impulses of the corresponding key to connect switching relays 201, 202, 203, 204, 205 and 206 to the line circuit. By operating one of the impulse-sending keys a desired switching relay may be selected and then current can be supplied to the relay to effect connection of the desired pair of seaphones to the observing station. The impulse sending keys 101' etc., may be of the type disclosed in patent to J. C. Field, 1,306,054, issued June 10, 1919; and the step-by-step selectors 101, etc., may be of the type disclosed in another patent to Field 1,343,256 granted June 15, 1920.

The compensator switch of Figs. 1, 2 and 3 is shown schematically in Fig. 4 and consists of the mechanism lying between artificial lines No. 1 and No. 2, which are adapted to effect the retardation or compensation of the electrical waves generated by the seaphones. The compensator switch is arranged to make connection in bridge of the artificial lines to conduct the compensated electrical waves to amplifiers 107 and 108 from which they pass to the receivers of headset 109 to be transformed into sound waves which are binaurally compared by the observer.

Probably the simplest arrangement of compensator from a theoretical standpoint is one in which the lagging waves are not retarded at all, and the leading waves are retarded by the difference in phase of the two wave trains. However, from a practical standpoint, there is advantage in the arrangement shown in Fig. 4 which retards to some extent both sets of waves, the difference of retardation being such that the waves are brought into phase. Artificial lines No. 1 and No. 2 are of ordinary construction and terminate in their surge impedances $Z_1$ and $Z_2$, respectively. Line No. 2 is built up of sections, each of which causes a small retardation, e. g. equivalent to the time required for sound to traverse .75 inches of water. This line, the contacts associated with brush 32, and the hand wheel 22 comprise the fine adjustment unit of the compensator. This unit alone is capable of providing sufficient compensation to obtain a bearing using the pairs of seaphones which are located on a five foot base. Line No. 1, the contacts associated with brush 58 and knob 46 (Fig. 1) comprise the coarse adjustment unit of the compensator which has a range sufficient to retard the electrical waves by an amount equal to the time of travel of sound through one hundred feet of water. Line No. 1 is similar to line No. 2 except that each of its sections has twenty times the retarding effect of a section of line No. 2, which gives the 20:1 ratio previously pointed out between the coarse and fine adjustment scales of the compensator.

Cam 65 is adapted to operate switching mechanism which shifts the connection to the artificial lines so that each may act upon the electrical waves coming to either the left or the right receiver, with the restriction that lines No. 1 and No. 2 are always in opposite circuits. When the fine adjustment scale (Fig. 2) is on zero, brush 32 is in the position shown in Fig. 4 which means that one-half of artificial line No. 2 is functioning. Therefore, in order that this will be a condition of zero compensation as indicated by the scale, i. e. in order that the compensator will not cause any relative phase displacement between the electrical waves coming to the left receiver and those coming to the right receiver, auxiliary artificial line 110 is placed immediately before line No. 1. This line has the same compensating effect as half of line No. 2, and is always in circuit. It is seen, therefore, that with the apparatus in the condition shown in the drawing, counter-clockwise rotation of the hand wheel from its zero position has the effect of adding compensation in the left circuit, while clockwise rotation from the zero position has the effect of adding compensation to the right circuit.

In Fig. 4 contact brush 58 of the coarse adjustment unit is shown in its zero position, and it is apparent from the wiring arrangement of the switch that movement of brush 58 either clockwise or counter-clockwise from its zero position has the same effect in making connection to artificial line No. 1. However, cam 65 so operates spring switches 70 that artificial line No. 1 is in the left circuit when brush 58 (knob 46, Fig. 1) is rotated counter-clockwise from its zero position, but is in the right circuit if brush 58 is rotated clockwise from its zero position. Therefore, as in the case of the fine adjustment unit, counter-clockwise rotation from the zero position has the effect of adding compensation to the left circuit, while clockwise rotation from the zero position has the effect of adding compensation to the right circuit.

It has been pointed out that artificial lines No. 1 and No. 2 are always in opposite circuits; and with the arrangement of the fine adjustment unit it is necessary upon shifting line No. 2 from the right circuit to the left circuit, to reverse the connection of the line with respect to the fine adjustment switch. This is in order to maintain the condition that counter-clockwise rotation from zero adds compensation to the left circuit, and clockwise rotation from zero adds compensation to the right circuit. This reversal of line No. 2 is accomplished by switching unit 73 which, at the proper time, shifts the connection of surge impedance $Z_2$ to the right end of line No. 2 and associates the left end of artificial line No. 2 with the left circuit. It should be noticed that although the spring switching units 70, 73, 75, 76, and 79 and the coarse adjustment brush 58 are all actuated by rotation of knob 46 (Fig. 1), there is no movement of the units 70, 73, 75, 76 or 79 while brush 58 is active.

The operation of the system to obtain the bearing of a source of sound such as a ship is as follows: The inner scale (Fig. 2) is placed in the "call" position which places cams 57, 65 and 68 in the position shown in Fig. 4. Impulse sending key 101' is then operated and causes a series of positive and negative impulses to be transmitted from battery 120 under the control of reversing relay 121. These impulses pass from the positive pole of battery 120, over conductors 121' and 122, center element of switch 75 to line conductor 131, selector 101, the condenser in series therewith to line conductor 133, conductor 123, to the negative pole of battery 120. Similar impulses pass through each of the other selectors 102, 103, 104, 105 and 106 but only selector 101 is sufficiently advanced to complete the switching relay circuit by the closure at contact 125. Selector 101, being completely advanced, is locked in the advanced position and the remaining selectors return to zero as soon as the condensers in series with them have become fully charged after the last pulse of current.

The inner scale (Fig. 2) is now moved so that the numeral 5 registers with the hair-line, which places cams 57 and 68 in such a position that the upper cam rollers are in depressions 126 and 127 respectively, and the lower cam roller of cam 57 in such a position as to place switching element 76 in the neutral position. As soon as contact 125 was closed, current from battery 120 passed over conductors 121′ and 122, center element of switch 75, conductor 130, point 125, switching relay 201, conductor 128, conductor 134, the lower element of switch 75, conductor 133, conductor 123, to the negative pole of battery 120. This current flowing through the polarized relay 201 operated it to its left position thus connecting seaphones A and B in circuit. When cams 57 and 68 are moved so that the cam rollers occupy depressions 126 and 127, respectively, this circuit is broken but due to the movement of switching relay 201 to the left position, there is a shunt circuit through which current flows to maintain the relay operated to the left. This circuit is from the positive pole of battery 120, conductor 121′, conductor 129, conductor 131, seaphone A, switch point 125, selector 201, seaphone B, conductor 133, conductor 123, to the negative pole of battery 120.

The impulses delivered over the conductors of the left and right circuits if allowed to act upon the observing apparatus might be detrimental, and in any event would annoy the observer and so means are provided to short-circuit the left and the right circuits and the receivers of the headset during the calling operation. It is noticed that with the cams in the "call" position, switch 75 directly short-circuits both to the left and right circuits thereby limiting to a minimum any input to the observing apparatus as a result of the calling operation. The observer is also further protected by the direct short-circuits across the receivers by relay 135 which is seen to be operated when cam 68 is in the "call" position. When the inner scale (Fig. 2) has been placed with numeral 5 in registration with the hair-line as shown, cams 57 and 68 are moved so that the upper rollers occupy depressions 126 and 127 which automatically removes the short circuit of the left and the right circuit by switching element 75. Through switching element 79 the circuit to relay 136 is broken allowing it to return to the non-operated position, which in turn allows relay 135 to return to the non-operated position and remove the short circuit from the receivers of the headset. Relay 135 being locked up until after relay 136 is released, there is sufficient lag in removing the short circuits from the receivers to allow all surges in the circuits to die down before the receivers become operative.

The apparatus is now in condition to make an observation using seaphones A and B to obtain a preliminary indication of the direction of the source of sound. During this determination, knob 46 is not moved and thus switching elements 73, 75, 76 and 79 remain stationary. All compensation is accomplished by use of the fine adjustment unit of the compensator. The observation to obtain the direction of the source of sound is made in the usual manner known to those skilled in the art, wheel 22 being rotated either clockwise or counter-clockwise as required until a binaural balance is obtained. If a balance is obtained by rotating wheel 22 in a counter-clockwise direction, it is known that compensation is added in left circuit and hence the source of sound is nearer seaphone A than seaphone B, and the reading of the outer scale which moves with hand wheel 22, gives an indication of the direction of the source of sound. As has previously been pointed out, this reading will limit the direction to only one of two possible directions unless the seaphones are so positioned with respect to the land that one of the possible directions is toward land and hence can be neglected.

If there is an ambiguity as to the direction of the source of sound, a second observation is made using seaphones C and D which establish a five foot base line perpendicular to the line of phones A and B. To obtain this reading, knob 46 is moved so that either of the lines marked 5T on the inner scale is in registration with the hair-line on the glass window. This movement of knob 46 does not bring into play any sections of artificial line No. 1 but causes a temporary actuation of switching elements 75 and 79 followed by the upper contacts of switching element 76 remaining closed. The temporary actuation of switching elements 75 and 79 consists in all of the contacts of these two switches being closed while the cam rollers are passing over the high points on cams 57 and 68. This temporarily short-circuits the left and right circuits and the receivers of the headset for the purpose that has been previously pointed out. The closure of the upper contacts of element 76 causes current to be delivered from battery 138 to reversing relay 121, thus bringing it into the operated position and reversing the direction of the current passing through polarized relay 201. This reversal of current causes the relay to move from its left operated position to its right operated position, thus substituting the pair of seaphones C—D for the pair A—B. A balance is now obtained using these phones which removes any ambiguity in the direction of the source of sound, and hence it is known approximately in which direction the ship lies.

To determine accurately the direction in which the ship lies, it is now necessary to make an observation using either the 50 foot or the 100 foot base line. In either event the operation of the apparatus would be similar and hence it will only be described with reference to the use of the 100 foot base line. The inner dial is again placed in the "call" position and impulse sending key 103' operates. This causes pulses to be delivered over the line in a manner which has been previously described to advance selector 103 until contact is made at 140. The operation of impulse key 103' causes the release of selector 101 and after selector 103 becomes fully advanced all of the other selectors return to the zero position as has been previously pointed out.

It requires an appreciable time interval to set up the circuits by means of selector 103 and hence the ship may have moved some distance in the meantime. For this reason means are provided for obtaining a balance on a five foot base line with the circuit set up by selector 103. Current from battery 120 passes through switching relay 203 to move it to its left operated position, thus making connection from the left and right circuit to contacts which are multipled to seaphones A and B. It is seen therefore that seaphones A and B which are on a five foot base line, are available for obtaining an approximate setting just prior to obtaining the final balance using seaphones G and H which are on a 100 foot base line. To make this approximate observation knob 46 is moved so as to place the inner scale with numeral 5 in registration with the hair line, and the balance is obtained in the manner previously described. The approximate bearing of the sound is now known and it is only necessary to shift to the 100 foot base line using detectors G and H and make the final observation. The scale of the coarse adjustment unit is twenty times the scale of the fine adjustment unit and since the base line of detectors G and H is twenty times the length of the base line of detectors A and B, it is only necessary to set the coarse adjustment scale to the same reading as that given by the fine adjustment scale using the 5 foot base line in order that the apparatus will be in a condition of approximate balance. This is done by moving knob 46 until the inner scale has the desired point in registration with the hair-line. As has been pointed out previously in connection with the observation using seaphones C and D this movement of knob 46 actuates the cam operated switching devices to cause a reversal of the current delivered from battery 120 to switching relay 203 thereby automatically causing the relay to be moved to its right operated position. This substitutes seaphones G and H for seaphones A and B. A balance is now obtained in the usual manner by moving hand wheel 22 or, if necessary, moving knob 46. The final value of compensation is obtained by multiplying the final setting of the inner scale by twenty and either adding to it or subtracting from it the setting of the outer scale, according to whether the outer scale was moved in the same direction or in the opposite direction from zero as the inner scale. This setting gives a measure of the direction of the source of sound from which the bearing can be obtained directly from a calibration chart or by appropriate calculation as is well understood in the art.

The impulses of the sending keys in addition to operating selectors 101, etc., operate relay 150 associated with a master selector 151. These impulses advance the selector so as to selectively light lamps 101" to 106" to indicate which of the selectors 101 to 106 was last utilized in the operation of the system.

The invention claimed is:

1. A submarine sound ranging system comprising a pair of telephone transmitters, a pair of line circuits, with which said transmitters are associated, a telephone receiver connected to the opposite end of each line circuit, two artificial lines adapted to be connected in said line circuits between the receivers and transmitters each having units of different values, and a manually operated switching mechanism for varying the number of units to be included in said line circuits and having means operated by the movement of the said mechanism to interchange said artificial lines with relation to said line circuits.

2. A submarine sound ranging system comprising a pair of telephone transmitters, a pair of line circuits with which said transmitters are associated, a telephone receiver connected to the opposite end of each line circuit, two artificial lines adapted to be connected in said line circuits between said receivers and transmitters each having units of different values, and a manually operated switching mechanism for varying the number of units to be included in said line circuits and having cams and contact springs operated thereby to interchange said artificial lines with respect to said line circuits.

3. A submarine sound ranging system comprising a pair of telephone transmitters, a pair of line circuits with which said transmitters are associated, a telephone receiver connected to the opposite end of each line circuit, two artificial lines adapted to be connected in said line circuits between said receivers and transmitters each having units of different values, and a switching mechanism having a shaft provided with a contact brush which engages terminals connected to units of one of said artificial lines and a second shaft provided with a contact brush which engages terminals connected to units of the other artificial line, said latter shaft also having cams which at a predetermined point in the rotation of said shaft operates contact springs on said switching mechanism to interchange said artificial lines with respect to said line circuits.

4. A submarine sound ranging system comprising pairs of telephone transmitters, a pair of line circuits, an impulse sender, and responsive thereto for selectively connecting a pair of transmitters to said line circuits, a telephone receiver connected to the opposite end of each line circuit, two artificial lines adapted to be connected in said line circuits, and a switching mechanism having a shaft provided with a contact brush which engages terminals connected to units of one of said artificial lines and a second shaft provided with a contact brush which engages terminals connected to units of the other artificial line, said latter shaft also having cams which at a predetermined point in the rotation of said shaft operates contact springs on said switching mechanism to interchange said artificial lines with respect to said line circuits, said shaft being also provided with a cam which actuates contact springs of said switching mechanism to connect the impulse sender to the line circuits and disconnect the same therefrom.

5. A submarine sound ranging system comprising pairs of telephone transmitters, a pair of line circuits an impulse sender, means responsive thereto for selectively connecting a pair of transmitters to said line circuits, a telephone receiver connected to the opposite end of each line circuit, two artificial lines adapted to be connected in said line circuits, and a switching mechanism having a shaft provided with a contact brush which engages terminals connected to units of one of said artificial lines and a second shaft provided with a contact brush which engages terminals connected to units of the other artificial line, said latter shaft also having cams which at a predetermined point in the rotation of said shaft operates contact springs on said switching mechanism to interchange said artificial lines with respect to said line circuits, said shaft being also provided with a cam to actuate contact springs of said switching mechanism to connect said sender to said line circuits and disconnect the same therefrom, and another cam to actuate contact springs of said switching mechanism to short circuit said line circuits to limit any input to the receivers as a result of the operation of the impulse sender.

In witness whereof, I hereunto subscribe my name this 13 day of June A. D., 1923.

GEORGE R. LUM.